Sept. 24, 1968  H. E. HEATH  3,402,448
THIN FILM CAPACITOR AND METHOD OF ADJUSTING
THE CAPACITANCE THEREOF
Filed May 4, 1966
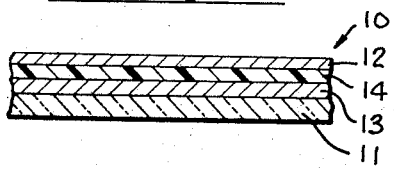
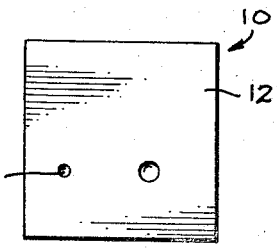
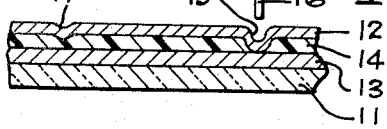
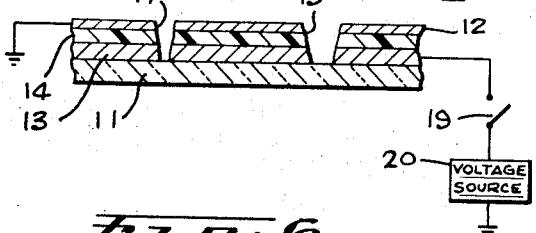
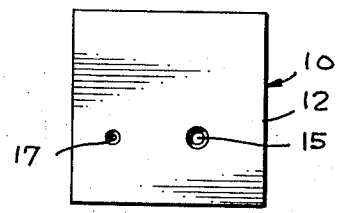
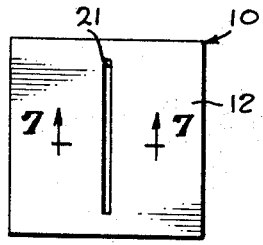
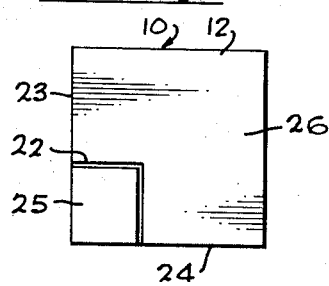
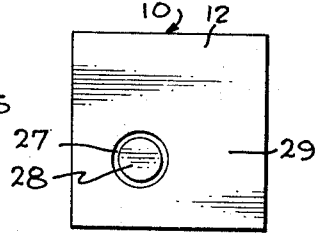
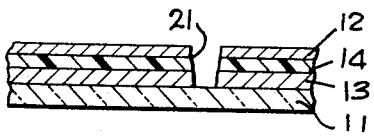
HERBERT E. HEATH
INVENTOR.
BY
Roger A. Marro

United States Patent Office 3,402,448
Patented Sept. 24, 1968

3,402,448
THIN FILM CAPACITOR AND METHOD OF ADJUSTING THE CAPACITANCE THEREOF
Herbert E. Heath, Canoga Park, Calif., assignor to The Bunker-Ramo Corporation, Stamford, Conn., a corporation of Delaware
Filed May 4, 1966, Ser. No. 552,471
6 Claims. (Cl. 29—25.42)

ABSTRACT OF THE DISCLOSURE

Highly precise thin-film capacitors and method of adjusting their capacitance to close tolerances. The capacitors comprise a substrate, a first metal film, a dielectric and a second metal film. One or both capacitor plate(s) is deformed to reduce their spacing. The plate(s) surface is depressed with the point or edge of a sharp instrument to provide point or line bridging. A section may also be isolated by drawing the instrument to separate the section from the remainder of the capacitor. An electric potential above the capacitor peak voltage rating applied between the electrodes breaks down the dielectric at the deformed portion and concomitantly produces sufficient heat to vaporize a minute section of at least one electrode. The process is repeated to desired capacitance value.

---

This invention relates to improvements in the production of electrical capacitors, and more particularly to the mass production of high tolerance capacitors especially of the thin film, fixed value variety as, for example, of the type forming a part of a complex arrangement of interconnected circuit components making up a microminiaturized integrated circuit.

In the mass production manufacture of electrical capacitors it is difficult to ensure that the nominal capacitance value of each capacitor produced in a given production run will fall within specified tolerance ranges. This is due to variations in the thickness of the dielectric, as well as its dielectric constant, and variations in the areas of the electrodes between which the dielectric is sandwiched.

The problem is of especially significance in the manufacture of microminiaturized integrated circuits where it is commonly required to produce and provide interconnections between a number of different type circuit components, such as capacitors, resistors, inductors, and semiconductor devices, on a single wafer or substrate. In the manufacture of such circuits it is commonplace to employ reactive deposition, metal evaporation, sputtering, photo-masking, mechanical masking, and etching techniques whereby there is produced on a single insulative substrate (such as ceramic) a pattern of thin film conductors and resistors interconnecting deposited semiconductor devices and capacitors. Each capacitor is formed by two areas of deposited thin metal film, each on opposite sides of an insulating layer which serves as the dielectric.

In the mass production of integrated circuit boards intended to depict the same schematic circuit configuration, minute variations in the uniformity with which metal is controllably applied to an/or etched from the substrates cause variations in the nominal value of the capacitors serving a given schematic function common to all substrates. Conventionally, thin film capacitors employed as microelectronic circuits can be batch fabricated to only a plus or minus 5% tolerance.

The foregoing problem is to a large extent obviated through the practice of a novel capacitance adjustment technique which characterizes the present invention.

Briefly, each capacitive element whose nominal value is critical to the performance of an integrated circuit is made larger in value than is required by the schematic circuit. After fabrication, minute portions of the thin film electrodes or plates of each such "critical" capacitor are removed by a unique electromechanical process until the desired nominal value of capacitance is obtained.

In accordance with one form of the present invention, the adjustment procedure is carried out by mechanically deforming one or both of the capacitor plates in a manner such that the spacing between the plates is substantially reduced (as, for example, by depressing one or both plates with the point or edge of a sharp instrument). Thereafter, an electrical potential substantially in excess of the maximum peak voltage rating for the capacitor is applied between the electrodes. The potential employed and current permitted to flow are such as to produce breakdown of the dielectric at and around the deformed portion or portions of the electrodes, and concomitantly produce sufficient heat to vaporize a minute portion of at least one electrode. The process is repeated, each time producing a reduction in the nominal value of the capacitor, until the desired value of capacitance is obtained.

In practicing the present invention, the actual breakdown between selected minute portions of the capacitor electrodes may be effected by sufficiently deforming one or both of the capacitor electrodes as to actually produce a mechanical bridging of the electrodes through the dielectric. Thereafter, a power source is connected between the electrodes, as before, and a portion of the electrode area, as well as perhaps an adjacent body of dielectric, removed by an electrical discharge.

In the event a relatively large area of electrode material is to be removed, the bridges or shorts may take the form of a circle or a square. In this manner, the total electrode area defined by the circle or square will be electrically isolated from the surrounding portion of electrode material. Such a procedure will greatly reduce the capacitance value as compared with the relatively smaller reduction effected by employing point or line bridges.

Therefore, the surface of a capacitor is deliberately deformed or scored to introduce bridges or shorts in a manner designed to reduce the electrode area by a specified amount. By causing these selected bridges or shorts to burn out, the desired reduction in capacitor area is accomplished, and hence, the capacitance value changed.

The features of the present invention which are believed to be novel are set forth with particularity in the appended claims. The present invention, both as to its organization and manner of operation, together with further objects and advantages thereof, may best be understood by reference to the following description taken in connection with the accompanying drawings, in which:

FIGURE 1 is a cross-sectional view of a typical thin film capacitor of the fixed type shown after fabrication but prior to adjustment of capacitance;

FIG. 2 is a cross-sectional view of the capacitor shown in FIG. 1 and illustrating the capacitor as having one electrode partially deformed so as to dispose a portion of the first electrode in electrical communication with the second electrode;

FIG. 3 is a top plan view of the modified capacitors illustrated in FIG. 2;

FIG. 4 is an enlarged cross-sectional view of the capacitor of FIG. 3 illustrating a voltage source coupled to the capacitor electrodes for effecting the removal of selected electrode material so as to change the electrode area for adjustment of capacitance between the two electrodes;

FIG. 5 is a top plan view of the adjusted capacitor of the present invention as illustrated in FIG. 4;

FIG. 6 is a top plan view of another embodiment of the present invention wherein the electrode deformation takes the form of a scored line preparatory to removal of selected portions of electrode material;

FIG. 7 is a cross-sectional view of the adjusted capacitor shown in FIG. 6 as taken in the direction of arrows 7—7 thereof; and FIGS. 8 and 9 are top plan views of still other embodiments of the present invention whereby relatively large areas of electrode material are electrically isolated from the main body of electrode material.

In general, a capacitor, often called a condenser, consists of two metal plates referred to as electrodes that are insulated from each other by a dielectric. The capacitance of a capacitor depends on the geometry of the plates and the kind of the dielectric used, since these factors determine the charge which can be put on the plates by a unit potential difference existing between the plates. Capacitance C in farads is the ratio of the charge $q$ on one of the plates of a capacitor (there being an equal and opposite charge on the other plate) to the potential difference $v$ between the plates; that is, capacitance is $C=q/v$. For a capacitor of fixed geometry and with constant properties of the dielectric between its plates, C is constant independent of $q$ or $v$, since as $v$ changes, $q$ changes with it in the same proportion. This latter statement assumes that the dielectric strength is not exceeded, and thus, that dielectric breakdown does not occur. If either the geometry or dielectric properties, or both, of a capacitor change, C will change also.

Referring to FIG. 1, a typical thin film fixed capacitor is illustrated in the direction of arrow 10 which may be referred to as a parallel-plate capacitor. The capacitor 10 includes a base or substrate 11 upon which successive layers or films of material may be deposited, sputtered or otherwise applied so as to result in spaced apart substantially parallel electrode plates 12 and 13 insulated from each other by a suitable dielectric 14. For example, the substrate 11 may take the form of glass and the two metal plates 12 and 13 may be composed of aluminum while the dielectric film 14 may take the form of silicon monoxide. The capacitor 10 may be classed as a fixed capacitor wherein the capacitance therein remains unchanged, except for small variations caused by temperature fluctuations or vibrations, for example. The metal films and the dielectric film are extremely thin, ranging in mils to less than a mil in thickness and therefore the size of the film and thickness of the substrate are greatly exaggerated in the drawings.

As mentioned earlier, the value of capacitance of the capacitor can be determined by controlling the area of the electrodes. However, it is not possible to accurately determine the electrode area with precision for a given number of capacitors included in a mass production run. Consequently, in following applicant's method, the capacitor is first fabricated in accordance with conventional techniques so that the capacitor 10 is produced in addition to many others in a single batch or production run. Subsequently, as shown more clearly in FIGS. 2 and 3, the area of the electrode is reduced by initially forming a point bridge or short 15 in the surface of electrode 12. Preferably, the point bridge may be formed by forcing the blunt end of a tool 16 against a selected exposed surface portion of the electrode 12 so that the material of the electrode is deformed in the direction of electrode 13. As illustrated, the deformation of the bridge point 15 completely separates the dielectric material film 14 and comes into contact with the electrode 13. However, it is to be noted that the deformation of the material of electrode 12 need only progress a short distance into the dielectric material such as is illustrated by bridge point 17.

Referring now to FIG. 3, it can be seen that the bridge points 15 and 17 occupy a relatively small portion on the surface area of the electrode 12. The point bridges may be disposed anywhere on the surface of the electrode within the edge marginal region of the capacitor geometry.

Referring now to FIG. 4, the area of the electrodes is reduced through thermionic action by connecting a voltage source 20 to plates 12 and 13. A high voltage from source 20 is discharged along the conductive paths provided by the point bridges 15 and 17 respectively. These bridges are caused to burn out and hence are removed. The cross-sectional dimension of the conductive paths formed by the point bridges, the magnitude of the voltage, and the peak current which is permitted to flow determine the amount of heat generated at the burnout point. This intense localized heat is created within the body of the capacitor at the bridges, and melts back or vaporizes the area of the electrodes which bound the shorted region. Thus, this results in a reduction of electrode area. It is important in the practice of the present invention that the magnitude of the voltage employed to vaporize the electrode be not less than the maximum voltage rating of the resulting capacitor.

Referring now to FIG. 6, another embodiment of the present invention is shown wherein the bridge formed in the electrode takes the form of a line 21. The line may be suitably formed by a scribing instrument or device which causes the deformation of the material of the electrode 12 in the direction of the electrode 13 through the dielectric 14. The line bridge forms a conductive path from the bottom electrode to the top electrode so that by discharging a high voltage therethrough, the line bridge is caused to burn out and hence, the area of the electrode is reduced along the line 21 which excludes some portions of the capacitor. FIG. 7 shows the line bridge burned out so that the electrode area is reduced.

Utilizing the method of the present invention, thin film capacitors have been fabricated, such as the aluminum-silicon monoxide-aluminum type, which can, through the practice of the present invention be adjusted to tolerance better than ±1%.

Referrnig now to FIGS. 8 and 9, additional embodiments of the present invention are illustrated wherein the value of capacitance of capacitor 10 is greatly reduced by electrically isolating a portion of electrode area. In FIG. 8, a line bridge 22 is scribed on the exposed surface of electrode 12 which depresses electrode material in the same fashion as described earlier; however, the line bridge 22 originates at a side edge 23 and terminates at another side edge 24. Consequently, an electrode area 25 defined by the line bridge 22 will be electrically isolated from a major electrode area 26 so that the capacitance value is reduced thereby. FIG. 9 illustrates a circular line bridge 27 impressed on the exposed surface of electrode 12 so as to electrically isolate electrode area 28 from the surrounding electrode area 29. It is to be understood that the line bridge may take the form of any desired shape, design, pattern or configuration such as for example, a star, square, rectangle, or any other geometric shape.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

The embodiments of the invention in which an exclusive property or privilege is claimed are defined as follows:

1. A method for adjusting the known value of capacitance of a thin film capacitor of the fixed type comprising the steps of:

depressing a selected area on the exposed surface of one electrode of the capacitor to cause electrode material to deform into the capacitor dielectric in the direction of the other electrode; and generating heat through the deformed material so as to effect thermionic breakdown of the deformed material defined by the selected depressed area whereby the value of capacitance is altered to another value.

2. The method as defined in claim 1 wherein said depressing step deforms the electrode material into an electrical conductive path with respect to the other electrode, and wherein said heat generating step includes discharging a high voltage through the conductive path to remove the selected deformed area of the electrode material.

3. The method as defined in claim 2 wherein said depressing step intentionally introduces a short circuit between electrodes to reduce the electrode area by a specified amount so that the total area of the capacitor is reduced.

4. The method as defined in claim 3 wherein said depressing step includes scribing a line bridge in the form of a geometric pattern located within the edge marginal regions of the capacitor so that the electrode material defined by the line bridge is electrically isolated from the surrounding electrode material.

5. The method as defined in claim 3 wherein said depressing step includes scribing a line bridge joining adjacent capacitor edges so as to electrically isolate a defined portion of electrode material from adjacent electrode material forming the fixed capacitor.

6. The invention as defined in claim 5 wherein said depressing step includes reducing the selected area of electrode material by a known amount so that the value of capacitance reduction is predetermined.

References Cited

UNITED STATES PATENTS 3,202,952    8/1965    Rayburn.

LEWIS H. MYERS, *Primary Examiner.*

E. GOLDBERG, *Assistant Examiner.*